Feb. 25, 1941.    R. D. SHAW    2,232,740
CONTROL SYSTEM
Filed May 5, 1939
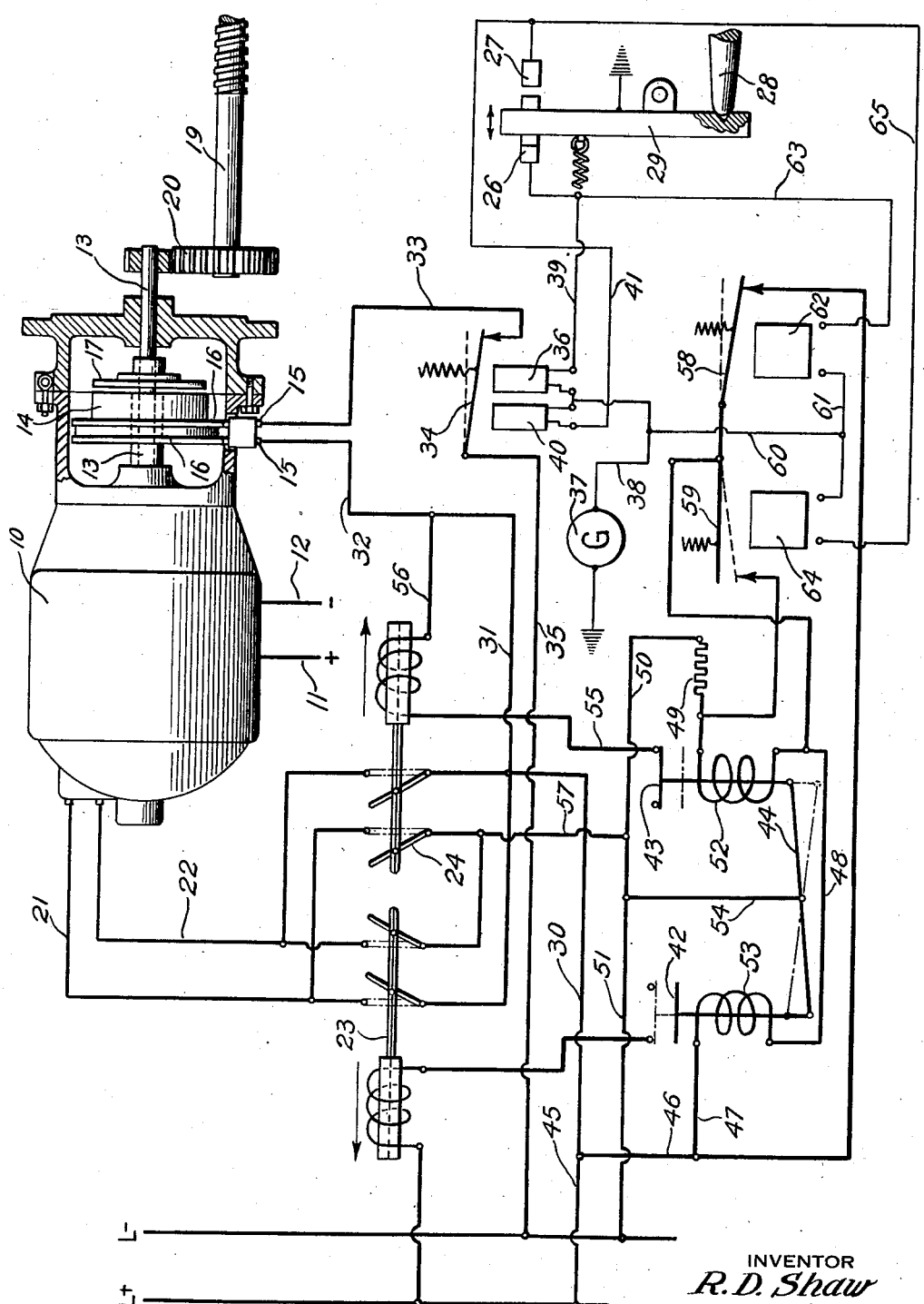
INVENTOR
R. D. Shaw
BY Joseph K. Schofield
ATTORNEY Patented Feb. 25, 1941

2,232,740

UNITED STATES PATENT OFFICE 2,232,740

CONTROL SYSTEM

Robert D. Shaw, Bloomfield, Conn., assignor to
Niles-Bement-Pond Company, Hartford, Conn.,
a corporation of New Jersey Application May 5, 1939, Serial No. 271,862

8 Claims. (Cl. 192—.02)

This invention relates to an electrically operated control for a motor driven feed shaft or screw for a machine tool so that the shaft or screw may be rotated in either direction and quickly stopped while the motor continues to rotate or prior to the motor coming to rest.

A primary object of the invention is to provide driving connections for a shaft or screw including a driving motor therefor having its armature directly coupled to a magnetic clutch, the armature of the clutch being connected, preferably through gearing, to the shaft or screw.

A feature that enables me to accomplish the above named object is that contacts are opened and closed, as by a tracer, closure of either contact serving to start rotation of the motor in one or the other direction and also to simultaneously energize the clutch to drivingly connect the motor to the shaft. When either contact is opened, however, the clutch is instantly deenergized so that the shaft or screw is disconnected from the motor and the shaft therefore will not overrun while the motor may continue to rotate.

Another object of the invention is to operate the control for the motor and clutch through a reversing switch or relay, the contacts being on a walking beam so that but one contact can be closed at any one time, these contacts in turn controlling solenoid operated switches for the motor field circuit in reverse directions.

In any tracer controlled machine the tracer for which controls movements of a slide or other movable machine member, it is essential that the control be extremely sensitive so that as the tracer moves over a model or template the movable machine member may be promptly stopped when the tracer contacts with or moves away from the model. In the present control system this stopping of the movable member is effected by the deenergizing of a magnetic clutch. In the forming of many shapes in a vertical milling machine or die sinker a reversal of movement of the movable machine member is not required as this member may have to remain in a fixed position until movement of another member is completed. Thereafter the machine member may be required to move again in the same direction so that reversal of the motor would not be required. Opening of a tracer contact therefore does not stop or reverse the rotation of the motor. This rotation continues until a further movement of the tracer contact effects closing of an opposite contact which again energizes the clutch and rotates the motor in the reverse direction.

Another object of the invention is to simultaneously energize a clutch when motor connections are to be made to rotate the motor in either direction, and when the shaft is to be stopped or have its rotation reversed, to disengage the clutch independently of the motor, thus preventing overrun of shaft due to the motor continuing to rotate or taking time to come to rest.

More particularly it is an object of the invention to control the rotation of a shaft or screw from alternately opened and closed contacts such as employed in the tracer controlled machine as shown in patent to Shaw, 1,683,581 granted September 4, 1928.

With the above and other objects in view the invention may include the features of construction and operation set forth in the following specification and illustrated in the accompanying drawing.

In the accompanying drawing annexed hereto and forming a part of this specification I have shown the invention embodied in electrical circuits for a machine of the type shown in the above referred to patent, but it will be understood that the invention can be otherwise embodied and that the drawing is not to be construed as defining or limiting the scope of the invention, the claims appended to this specification being relied upon for that purpose.

In the drawing the figure shows a wiring diagram for controlling the motor and clutch for stopping and for rotating a screw in opposite directions from contacts opened and closed by movement of a member which may comprise a tracer of a type shown in the above referred to patent.

In the above mentioned drawing there has been shown but one embodiment of the invention which is now deemed preferable, but it will be understood that changes and modifications may be made within the scope of the appended claims without departing from the spirit of the invention.

Briefly and in its broadest aspect my invention may include: First, a motor; second, a magnetic clutch rotated directly therefrom; third, a shaft or screw drivingly connected to the armature of the clutch; fourth, a tracer, movement of which to and from a central position opens and closes contacts of relay circuits; and fifth, circuits controlled by said relay circuits for energizing said clutch and for closing field circuits of said motor for rotation of the motor in either direction.

Referring more in particular to the diagram, the motor 10 may be of any suitable type having its field windings supplied with current from a suitable source by lead wires 11 and 12. As the direction of rotation of the motor 10 is preferably controlled by reversing the direction of the current in the armature windings only the leads 11 and 12 from a suitable source of current may be permanently connected to the motor 10. Mounted on the motor armature shaft 13 for rotation therewith is a magnetic clutch 14 supplied with current from brushes 15 engaging slip rings 16 on the clutch. The circuit for the brushes 15 will presently be more fully described. Adjacent the magnetic clutch body 14 is the armature 17 therefor mounted on a shaft 18, this shaft 18 being drivingly connected to a shaft or screw 19 as by means of the gearing 20. Armature 17 when the magnetic clutch 14 is energized is drawn toward and forced to rotate with the clutch 14 so that screw 19 is rotated whenever the circuit for the brushes 15 is closed and the motor 10 is rotated.

The motor 10 is rotated in opposite directions depending upon the connections to its armature windings through lead wires 21 and 22 connected through either of two solenoid switches 23 and 24 to a source of current by connections forming part of the control circuits forming the present invention. These circuits will presently be more fully described.

To energize the circuits for the magnetic clutch 14 and the armature windings of the motor 10 contacts 26 and 27 opened and closed by movements of a tracer 28 are employed. The tracer 28 is shown fragmentarily only and its movements from the position shown in the diagram oscillate a lever 29 which, as shown, is grounded. As the operation of the tracer 28 upon the lever 29 and the mounting of the lever 29 are or may be similar in every way to the construction shown in Fig. 16 of the above referred to patent, further description is not thought to be necessary. The circuits for the clutch 14 include conductors 45, 30, 31 and 32, the brushes 15, conductor 33, relay operated switch 34 and conductor 35. Conductors 45 and 35 are connected to the main leads L+ and L— respectively. With the tracer in the position shown, switch 34 is drawn to its closed position by solenoid 36 which is energized by current from a small grounded generator 37 through conductors 38, 39, contactor 26 to the grounded lever 29. With the contact 27 closed a circuit is closed to solenoid 40 adjacent solenoid 36 through conductors 38 and 41 to the grounded lever 29. With either contact 26 or 27 closed, therefore, switch 34 will be closed and the clutch 14 energized.

To energize the motor windings through leads 21 and 22 the solenoid for switch 23 or 24 is closed by a circuit including one or the other of contactors 42 or 43 of a reversing switch connected by a walking arm 44 so that but one contact 42 or 43 may be closed at any instant. The coils 53 and 52 for contactors 42 and 43 respectively are connected to the leads L+ and L— by conductors 45, 46, 47, 48, resistance 49 and conductors 50 and 51. By short circuiting either solenoid 52 or 53 the opposite contactor will be closed. With contactor 43 closed as shown, switch 24 will be closed by a circuit including conductors 45, 30, 31, 56, 55, 44, 54 and 51. The motor will therefore be energized for rotation in one direction. This circuit includes conductors 45, 30, switch 24, lead 22, lead 21, switch 24 and conductors 57 and 51. With contactor 42 closed, circuits to the leads 21 and 22 will be closed but in the opposite direction and through switch 23 so that the motor 10 will rotate in the opposite direction.

Coils 52 and 53 of the switches 43 and 42 are connected in a circuit to the main leads L+ and L— by conductors 45, 46, 47, 48, resistance 49 and conductors 50 and 51. To short circuit either coil 52 or 53, circuits including switches 58 and 59 are employed. Switch 58 is closed by a circuit from generator 37 through conductors 38, 60, 61, solenoid 62 and conductor 63 to the contact 26 and grounded lever 29. Whenever contact 26 is closed, therefore, the motor will be rotated in one direction. With contact 27 closed, switch 59 will be closed by a circuit from generator 37 through conductor 60 to the solenoid 64, and conductor 65 to the grounded lever 29. With either switch 58 or 59 closed, a circuit will be closed to short circuit one or the other of the contactor coils 52 or 53. Switch 58 when closed short circuits coil 52 and switch 59 when closed short circuits coil 53.

In operation when a tracer controlled contact 26 or 27 is opened the relay 34 for the clutch circuit is promptly opened which instantly deenergizes the magnetic clutch 14 and breaks the connection between the motor 10 and screw 19. Further rotation of the screw is therefore discontinued. The contactors 42 and 43 of the reversing switch will remain in the same position for the reason that, although switch 58 or 59 has opened and both coils 52 and 53 are energized, the closed contactor will be held closed for the reason that its air gap is less and its flux greater than that.

With the tractor 28 moved sufficiently in any direction from the position shown in the diagram the contact on the opposite side of the lever 29 is closed. Closure of this opposite contact closes a circuit to draw the relay 34 down to close the magnetic clutch circuit so that the clutch 15 is therefore reenergized. This movement of the tracer 28 also closes relay 59 and raises contactor 42 at the left of the walking beam 44 by short circuiting the opposite coil. The solenoid switch 23 at the left of the walking beam 44 is therefore closed which closes the armature circuit to leads 21, 22 in the opposite direction. Rotation of the motor therefore takes place in the opposite direction and this rotation continues so long as this tracer contact 27 in the diagram is closed. As soon as either tracer contact 26 or 27 is opened the clutch 14 is deenergized but rotation of the motor 10 will continue in the same direction until the opposite contact on the tracer lever 29 is closed. Continued rotation of the motor, however, has no effect upon rotation of the shaft 19, as the clutch 15 has been deenergized.

What I claim is:

1. A control system comprising in combination, a motor, a magnetic clutch drivingly connected therewith, an armature for said clutch adjacent thereto and connected to a shaft for rotation therewith whereby rotation of said armature will rotate said shaft, tracer controlled contacts, circuits controlled by said contacts to simultaneously energize said clutch and start rotation of said motor in a predetermined direction, and circuits to deenergize said clutch when said contacts are simultaneously opened.

2. A control system comprising in combination, a motor, a magnetic clutch drivingly connected therewith, an armature for said clutch adjacent thereto and connected to a shaft for rotation therewith whereby rotation of said armature will rotate said shaft, tracer controlled contacts, relays controlled by said contacts to open and close circuits to simultaneously energize said clutch and start rotation of said motor in a predetermined direction, and relay controlled circuits to deenergize said clutch when said contacts are simultaneously opened.

3. A control system comprising in combination, a motor, a magnetic clutch drivingly connected therewith, an armature for said clutch adjacent thereto and connected to a shaft whereby rotation of said armature with said clutch will rotate said shaft, tracer controlled contacts, circuits controlled by said tracer contacts to simultaneously energize said clutch and start rotation of said motor in a predetermined direction, and circuits controlling said motor rotation and reversing said rotation when one tracer contact is opened and the opposite contact is closed.

4. A control system comprising in combination, a motor, a magnetic clutch drivingly connected therewith, an armature for said clutch adjacent thereto and connected to a shaft whereby rotation of said armature with said clutch will rotate said shaft, tracer controlled contacts, circuits controlled by said tracer contacts to simultaneously energize said clutch and start rotation of said motor in a predetermined direction, said circuits deenergizing said clutch when said contacts are simultaneously open, and circuits controlling said motor rotation and reversing said rotation when one tracer contact is opened and the opposite contact is closed.

5. A control system comprising in combination, a motor, a magnetic clutch drivingly connected therewith, an armature for said clutch adjacent thereto and connected to a shaft whereby rotation of said armature will rotate said shaft, tracer controlled contacts, circuits controlled by said tracer contacts to simultaneously energize said clutch and start rotation of said motor in a predetermined direction, and circuits controlled by the opening of one of said contacts to deenergize said clutch while said motor continues to rotate in the same direction.

6. A control system comprising in combination, a motor, a magnetic clutch drivingly connected therewith, an armature for said clutch adjacent thereto and connected to a shaft whereby rotation of said armature will rotate said shaft, tracer controlled contacts, circuits controlled by said tracer contacts to simultaneously energize said clutch and start rotation of said motor in a predetermined direction, and circuits controlled by the opening of one of said contacts to deenergize said clutch while said motor continues to rotate in the same direction, said circuits when an opposite tracer contact is closed being adapted to reenergize said clutch and rotate the motor in the reverse direction.

7. A control system comprising in combination, a motor, a magnetic clutch drivingly connected therewith, an armature for said clutch adjacent thereto and connected to a shaft whereby rotation of said armature will rotate said shaft, tracer controlled contacts, circuits controlled by said tracer contacts to simultaneously energize said clutch and start rotation of said motor in a predetermined direction, circuits controlled by the opening of one of said contacts to deenergize said clutch while said motor continues to rotate in the same direction as long as both contacts are open, and circuits to reenergize said clutch and rotate said motor in the reverse direction when said opposite contact is closed.

8. A control system comprising in combination, a motor, a magnetic clutch drivingly connected therewith, an armature for said clutch adjacent thereto and connected to a shaft whereby rotation of said armature will rotate said shaft, tracer controlled contacts, circuits controlled by said tracer contacts to simultaneously energize said clutch and start rotation of said motor in a predetermined direction, and circuits controlled by the opening of one of said contacts to deenergize said clutch while said motor continues to rotate in the same direction as long as both contacts are open, said circuits when an opposite tracer contact is closed being adapted to reenergize said clutch and rotate the motor in the reverse direction.

ROBERT D. SHAW.